(12) United States Patent
Chendamarai Kannan et al.

(10) Patent No.: US 10,674,389 B2
(45) Date of Patent: Jun. 2, 2020

(54) ACCESS TERMINAL RADIO LINK MONITORING (RLM) ON A SHARED COMMUNICATION MEDIUM

(71) Applicant: QUALCOMM Incorporated, San Diego, CA (US)

(72) Inventors: Arumugam Chendamarai Kannan, San Diego, CA (US); Andrei Dragos Radulescu, San Diego, CA (US); Chirag Sureshbhai Patel, San Diego, CA (US); Tamer Adel Kadous, San Diego, CA (US); Ashok Mantravadi, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/828,002

(22) Filed: Nov. 30, 2017

(65) Prior Publication Data

US 2018/0160328 A1 Jun. 7, 2018

Related U.S. Application Data

(60) Provisional application No. 62/429,038, filed on Dec. 1, 2016.

(51) Int. Cl.
*H04W 24/10* (2009.01)
*H04W 36/30* (2009.01)
(Continued)

(52) U.S. Cl.
CPC .......... *H04W 24/10* (2013.01); *H04B 7/0632* (2013.01); *H04L 1/00* (2013.01);
(Continued)

(58) Field of Classification Search
None
See application file for complete search history.

(56) References Cited

U.S. PATENT DOCUMENTS

2004/0058699 A1* 3/2004 Jonsson ................ H04W 52/12
455/522
2008/0075145 A1* 3/2008 Balachandran ........ H04B 1/715
375/132
(Continued)

FOREIGN PATENT DOCUMENTS

WO 2014164711 A1 10/2014
WO WO-2016068653 A1 * 5/2016 ............ H04W 24/00
WO 2016121917 A1 8/2016

OTHER PUBLICATIONS

Samsung, "Discussion on RRM for LAA", May 29, 2015, R1-152867 (Year: 2015).*

(Continued)

*Primary Examiner* — Ayaz R Sheikh
*Assistant Examiner* — Tarell A Hampton
(74) *Attorney, Agent, or Firm* — Muncy, Geissler, Olds & Lowe, P.C./QUALCOMM

(57) ABSTRACT

Techniques for access terminal radio link monitoring on a shared communication medium are disclosed. In an aspect, an access terminal detects a missed reference signal event associated with a radio link established on the shared communication medium, wherein detecting the missed reference signal event comprises determining that the access terminal did not detect a reference signal for measuring a quality of the radio link transmitted during a reference signal configuration window, assigns an error metric to the missed reference signal event based on reference signal monitoring capabilities of the access terminal, and triggers a radio link failure based on the assigned error metric. In an aspect, the missed reference signal event may be a missed Discovery (Continued)

Reference Signaling (DRS) event, the error metric may be a Block Error Rate (BLER) weight, and the reference signal for measuring the quality of the radio link comprises a Cell-specific Reference Signal (CRS).

28 Claims, 6 Drawing Sheets

(51) Int. Cl.
| | |
|---|---|
| *H04B 7/06* | (2006.01) |
| *H04L 5/00* | (2006.01) |
| *H04W 84/12* | (2009.01) |
| *H04L 1/00* | (2006.01) |
| *H04W 16/14* | (2009.01) |
| *H04W 24/02* | (2009.01) |

(52) U.S. Cl.
CPC ........... *H04L 5/0048* (2013.01); *H04W 36/30* (2013.01); *H04W 16/14* (2013.01); *H04W 24/02* (2013.01); *H04W 84/12* (2013.01)

(56) References Cited

U.S. PATENT DOCUMENTS

| | | | | |
|---|---|---|---|---|
| 2010/0180170 A1* | 7/2010 | Seo | ............... | H04B 7/0691 714/748 |
| 2013/0303223 A1* | 11/2013 | Patil | ............... | H04W 8/005 455/517 |
| 2015/0045050 A1* | 2/2015 | Sartori | ............ | H04W 72/0446 455/452.1 |
| 2015/0085697 A1* | 3/2015 | Gulati | ............. | H04W 48/14 370/254 |
| 2015/0215903 A1* | 7/2015 | Zhao | ............... | H04W 72/04 370/329 |
| 2015/0245193 A1* | 8/2015 | Xiong | ............. | H04W 4/80 370/328 |
| 2015/0264551 A1* | 9/2015 | Ko | ................... | H04W 76/14 370/329 |
| 2015/0304834 A1* | 10/2015 | Sorrentino | ............ | H04W 12/08 370/329 |
| 2015/0334757 A1* | 11/2015 | Seo | ............... | H04W 24/08 370/329 |
| 2015/0349924 A1* | 12/2015 | Wang | .............. | H04L 1/0061 714/807 |
| 2016/0073366 A1* | 3/2016 | Ng | .................. | H04W 56/001 370/329 |
| 2016/0198330 A1* | 7/2016 | Chung | ............. | H04W 76/14 370/329 |
| 2016/0205612 A1* | 7/2016 | Seo | ............... | H04L 1/004 370/252 |
| 2016/0262090 A1* | 9/2016 | Marin | ............. | H04W 74/0816 |
| 2016/0270085 A1* | 9/2016 | Sorrentino | ............ | H04W 8/005 |
| 2016/0302230 A1* | 10/2016 | Novlan | ............. | H04B 17/318 |
| 2016/0366577 A1* | 12/2016 | Hu | ................. | H04W 8/005 |
| 2017/0048906 A1* | 2/2017 | Lee | ............... | H04W 76/14 |
| 2017/0230926 A1* | 8/2017 | Seo | ............... | H04J 11/0073 |
| 2017/0245168 A1* | 8/2017 | Yi | ................... | H04W 24/00 |
| 2017/0251382 A1* | 8/2017 | Feng | ............. | H04W 24/02 |
| 2017/0289940 A1* | 10/2017 | Yang | ............. | H04W 56/0015 |
| 2018/0262282 A1* | 9/2018 | Yang | ............. | H04L 1/00 |
| 2019/0053082 A1* | 2/2019 | Alriksson | ............ | H04W 24/08 |

OTHER PUBLICATIONS

International Search Report and Written Opinion—PCT/US2017/064149—ISA/EPO—dated Feb. 13, 2018.

Qualcomm Incorporated: "DRS Design Details", 3GPP Draft; R1-157040 DRS Design Details, 3rd Generation Partnership Project (3GPP), Mobile Competence Centre; 650, Route Des Lucioles; F-06921 Sophia-Antipolis Cedex; France, vol. RAN WG1, No. Anaheim, USA; Nov. 14, 2015-Nov. 22, 2015 Nov. 2015, XP051003343, Retrieved from the Internet: URL:http://www.3gpp.org/ftp/Meetings_3GPP_SYNC/RAN1/Docs/ [retrieved on Nov. 15, 2015], 5 pages.

Qualcomm Incorporated: "Further Considerations on RRM for LAA", 3GPP Draft; R2-154845 LAA RRM, 3rd Generation Partnership Project (3GPP), Mobile Competence Centre; 650, Route Des Lucioles; F-06921 Sophia-Antipolis Cedex; France, vol. RAN WG2, No. Malmo, Sweden; Oct. 5, 2015-Oct. 9, 2015 Oct. 4, 2015, XP051005306, Retrieved from the Internet: URL:http://www.3gpp.org/ftp/Meetings_3GPP_SYNC/RAN2/Docs/ [retrieved on Oct. 4, 2015], 3 pages.

Qualcomm Incorporated: "RRM Requirements for LAA", 3GPP Draft; R4-79AH-0182, 3rd Generation Partnership Project (3GPP), Mobile Competence Centre; 650, Route Des Lucioles; F-06921 Sophia-Antipolis Cedex; France, vol. RAN WG4, No. Hong Kong, China; Jun. 28, 2016-Jun. 30, 2016 Jun. 21, 2016, XP051120388, Retrieved from the Internet: URL:http://www.3gpp.org/ftp/tsg_ran/WG4_Radio/TSGR4_AHs/TSGR4_79AH/Docs/ [retrieved on Jun. 21, 2016], 2 pages.

Samsung: "LAA L3 Filter Output Reset", 3GPP Draft; R2-161109 36331_CR2004_(REL-13)_LAA L3 Reset, 3rd Generation Partnership Project (3GPP), Mobile Competence Centre; 650, Route Des Lucioles; F-06921 Sophia-Antipolis Cedex; France, vol. RAN WG2, No. Malta; Feb. 15, 2016-Feb. 19, 2016 Feb. 14, 2016, XP051055098, Retrieved from the Internet: URL:http://www.3gpp.org/ftp/Meetings_3GPP_SYNC/RAN2/Docs/ [retrieved on Feb. 14, 2016], 5 pages.

\* cited by examiner

ACCESS TERMINAL RADIO LINK MONITORING (RLM) ON A SHARED COMMUNICATION MEDIUM

CROSS-REFERENCE TO RELATED APPLICATIONS

The present Application for Patent claims the benefit of U.S. Provisional Application No. 62/429,038, entitled "ACCESS TERMINAL RADIO LINK MONITORING (RLM) ON A SHARED COMMUNICATION MEDIUM," filed Dec. 1, 2016, assigned to the assignee hereof, and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for radio link monitoring on a shared communication medium includes detecting, by an access terminal, a missed reference signal event associated with a radio link established on the shared communication medium between the access terminal and an access point, wherein detecting the missed reference signal event comprises determining that the access terminal did not detect a reference signal for measuring a quality of the radio link transmitted during the reference signal configuration window, assigning, by the access terminal, an error metric to the missed reference signal event based on reference signal monitoring capabilities of the access terminal, and triggering, by the access terminal, a radio link failure based on the assigned error metric.

In an aspect, an apparatus for radio link monitoring on a shared communication medium includes at least one processor of an access terminal configured to: detect a missed reference signal event associated with a radio link established on the shared communication medium between the access terminal and an access point, wherein detection of the missed reference signal event comprises a determination that the access terminal did not detect a reference signal for measuring a quality of the radio link transmitted during the reference signal configuration window; assign an error metric to the missed reference signal event based on reference signal monitoring capabilities of the access terminal; and trigger a radio link failure based on the assigned error metric.

In an aspect, an apparatus for radio link monitoring on a shared communication medium includes a means for processing of an access terminal configured to: detect a missed reference signal event associated with a radio link established on the shared communication medium between the access terminal and an access point, wherein detection of the missed reference signal event comprises a determination that the access terminal did not detect a reference signal for measuring a quality of the radio link transmitted during a reference signal configuration window, assign an error metric to the missed reference signal event based on reference signal monitoring capabilities of the access terminal, and trigger a radio link failure based on the assigned error metric.

In an aspect, a non-transitory computer-readable medium storing computer-executable instructions for radio link monitoring on a shared communication medium includes the computer-executable instructions comprising at least one instruction instructing an access terminal to detect a missed reference signal event associated with a radio link established on the shared communication medium between the access terminal and an access point, wherein detecting the missed reference signal event comprises determining that the access terminal did not detect a reference signal for measuring a quality of the radio link transmitted during a reference signal configuration window, at least one instruction instructing the access terminal to assign an error metric to the missed reference signal event based on reference signal monitoring capabilities of the access terminal, and at least one instruction instructing the access terminal to trigger a radio link failure based on the assigned error metric.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Techniques for access terminal radio link monitoring on a shared communication medium are disclosed. In an aspect, an access terminal detects a missed reference signal event associated with a radio link established on the shared communication medium, wherein detecting the missed reference signal event comprises determining that the access terminal did not detect a reference signal for measuring a quality of the radio link transmitted during a reference signal configuration window, assigns an error metric to the missed reference signal event based on reference signal monitoring capabilities of the access terminal, and triggers a radio link failure based on the assigned error metric. In an aspect, the missed reference signal event may be a missed Discovery Reference Signaling (DRS) event, the error metric may be a Block Error Rate (BLER) weight, and the reference signal for measuring the quality of the radio link comprises a Cell-specific Reference Signal (CRS).

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
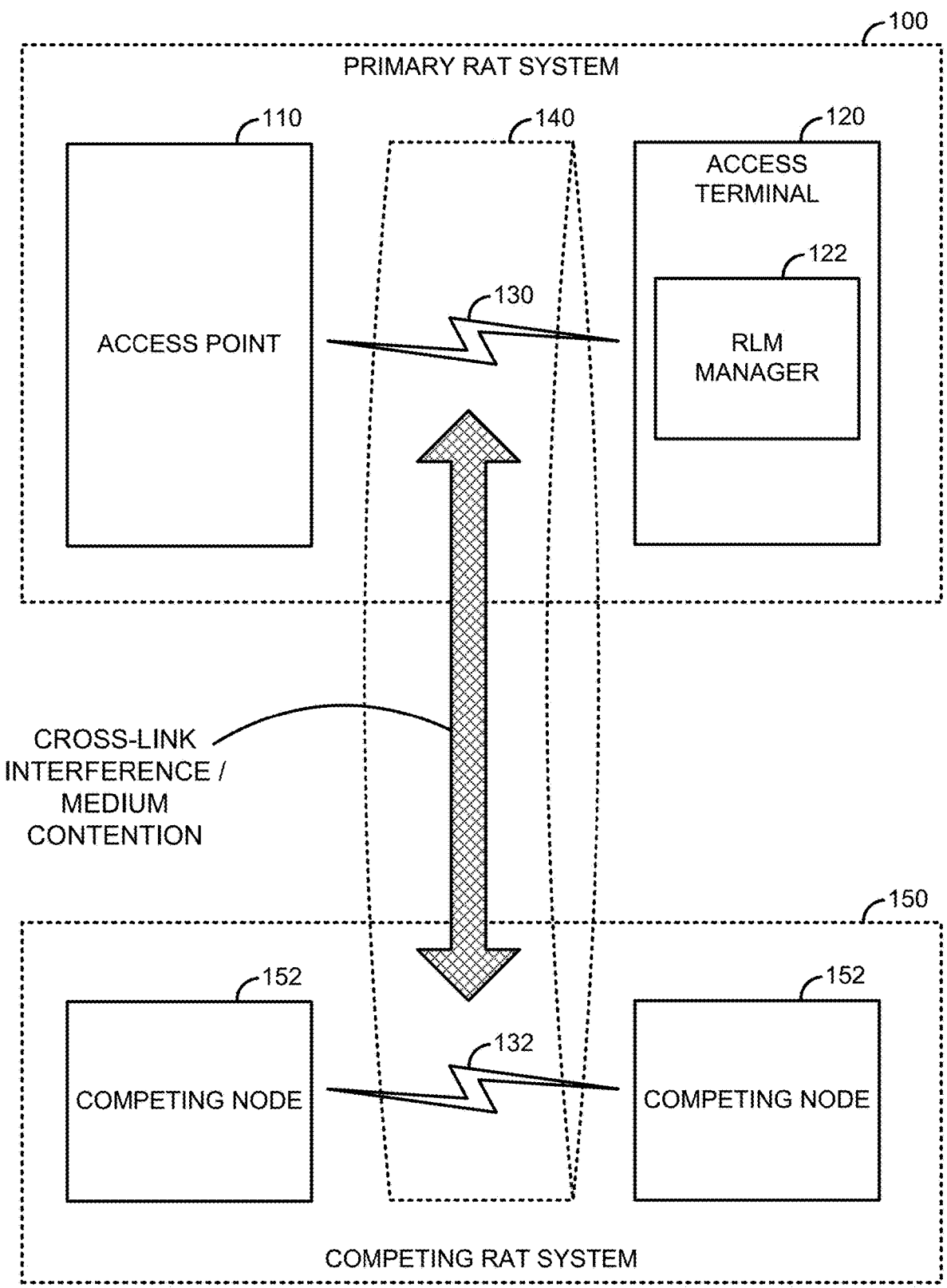
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a radio link, including information related to various types of communication (e.g., voice, data, multimedia services, associated control signaling, etc.). The primary RAT system 100 is shown as including an access point 110 and an access terminal 120 in communication with each other over a radio link 130. The competing RAT system 150 is shown as including two competing nodes 152 in communication with each other over a separate radio link 132, and may similarly include one or more access points, access terminals, or other types of wireless nodes. As an example, the access point 110 and the access terminal 120 of the primary RAT system 100 may communicate via the radio link 130 in accordance with Long Term Evolution (LTE) technology, while the competing nodes 152 of the competing RAT system 150 may communicate via the radio link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, Personal Digital Assistant (PDA), router, tablet computer, laptop computer, desktop computer, server, entertainment device, Internet of Things (IOT)/Internet of Everything (IOE) device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. In an aspect, such an access point may correspond to a small cell access point, for example "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the radio link 130 used by the primary RAT system 100 and the radio link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the radio link 130 and the radio link 132. Further, some RATs and some jurisdictions may require contention procedures, such as "Listen Before Talk (LBT)," for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access terminal 120 may be variously configured in accordance with the teachings herein to provide or otherwise support the radio link monitoring techniques discussed briefly above. For example, the access terminal 120 may include a Radio Link Monitoring (RLM) manager 122. The RLM manager 122 may be configured in different ways to manage the radio link monitoring on the communication medium 140.

Figure 2:
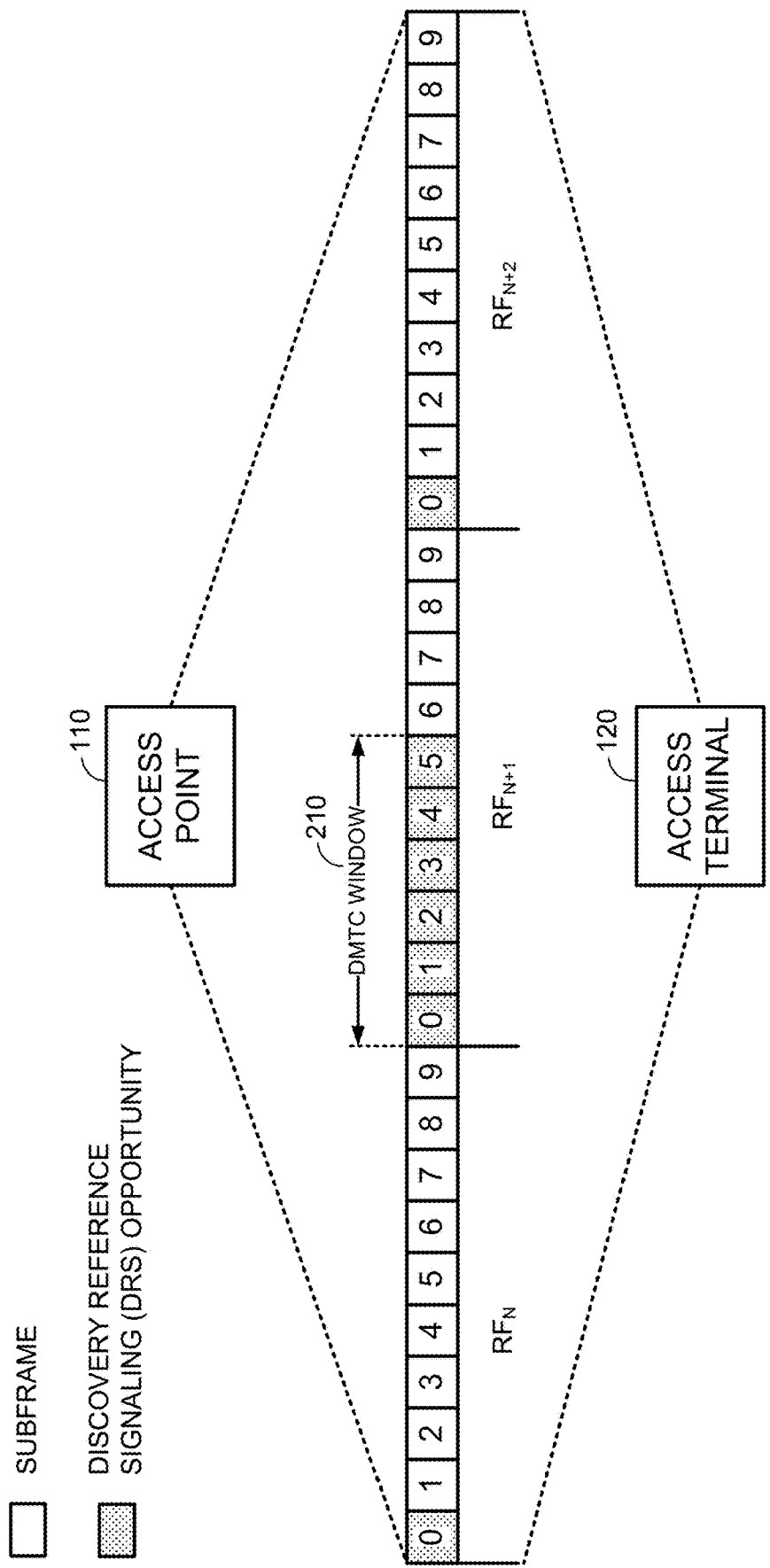
FIG. 2 illustrates an example frame structure according to an aspect of the disclosure.

FIG. 2 illustrates an example frame structure that may be implemented for the primary RAT system 100 on the communication medium 140 to facilitate contention-based access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., $RF_{N+1}$) may be delayed in relation to an absolute time until the access point 110 or the access terminal 120 is able to win contention.

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Measurements (RRM)/Radio Link Measurements (RLM)), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on. The DRS may be scheduled for transmission periodically (e.g., every 10 ms) in a designated subframe(s) of each radio frame (e.g., subframe SF0) or in a range of such subframes, referred to as a DRS Measurement Timing Configuration (DMTC) window 210, defined around a designated subframe (e.g., spanning the first six subframes SF0 to SF5 of the radio frame).

For LTE operating in licensed spectrum, the periodic DRS signals are used to monitor the quality of the radio link (e.g., radio link 130) and to trigger a Radio Link Failure (RLF) when operating conditions on the radio link deteriorate. In this respect, there are certain important differences between LTE in licensed spectrum and LTE in unlicensed spectrum (e.g., MulteFire™). First, LTE in unlicensed spectrum has fewer CRS instances due to the relatively sparse DRS periodicity. More specifically, for LTE in licensed spectrum, CRS occurs every subframe, whereas for LTE in unlicensed spectrum, DRS typically occurs every 40 ms, 80 ms, or 160 ms. Second, LTE in unlicensed spectrum can have missed DRS events, which may be due to an LBT failure at the access point 110 or a CRS scrambling mismatch at the access terminal 120, described further below.

There are several observations that can be made regarding a CRS scrambling mismatch. First, relevant standards may specify that within a DMTC, DRS scrambling is either SF0 or SF5 scrambling (referred to as "SF 0/5 scrambling"), depending on whether DRS is transmitted on SF0 to SF4 or SF5 to SF9, respectively, or "subframe-specific scrambling." In SF 0/5 scrambling, subframes 0-4 may use one type of scrambling (e.g., SF0 scrambling), while subframes 5-9 may use a different type of scrambling (e.g., SF5 scrambling). In subframe-specific scrambling, each of the 10 subframes within a frame may use a different scrambling. Accordingly, on subframes within the DMTC window (e.g., DMTC window 210), a subframe may have subframe-specific scrambling or SF 0/5 scrambling. Second, the ability to monitor one or both CRS scrambling possibilities (i.e., one or both of subframe-specific or SF 0/5 scrambling) is a capability of the access terminal 120 defined by the value "mf-MonitorTwoCRSScramblings." Regardless of the scrambling option used, there may be no ambiguity when the access terminal 120 monitors SF0 or SF5, since those two subframes will be associated with their respective scrambling options in any event. Depending on its capability, however, the access terminal 120 may not be able to detect DRS on remaining subframes (e.g., SF 1-4 or SF 6-9) since it may not be able to monitor for both subframe-specific scrambling or SF0/5 scrambling, which could both be options for those remaining subframes. In other words, for a received DRS on SF 1, for example, the access terminal 120 may not know whether SF0 scrambling is used in accordance with SF 0/5 scrambling, or a different scrambling is used in accordance with subframe-specific scrambling. Third, in some instances, within the serving cell DMTC, the access terminal 120 may prioritize the monitoring of signals that use subframe-specific scrambling.

Figure 3:
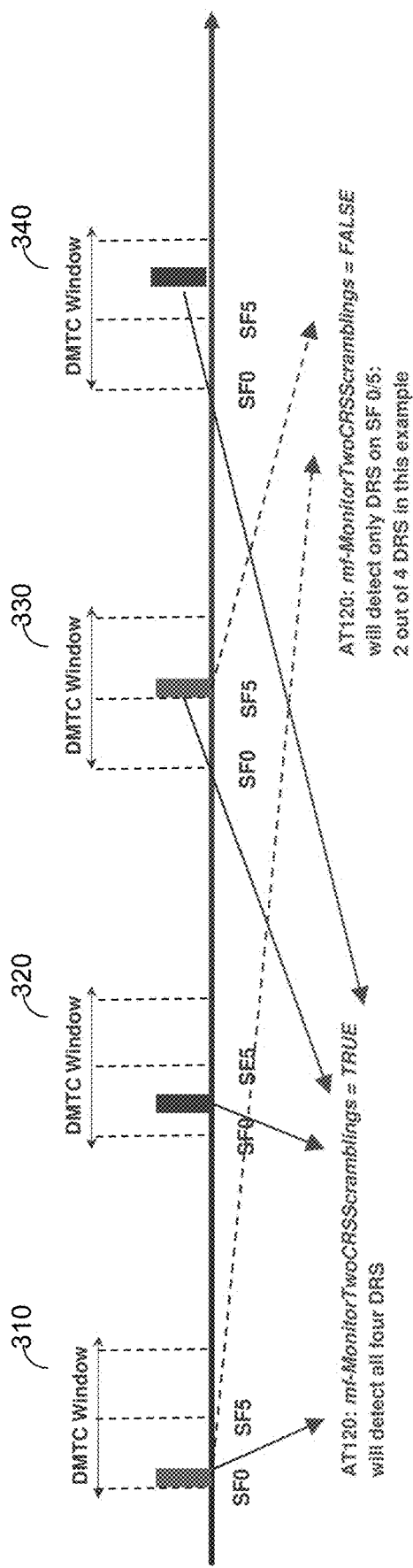
FIG. 3 illustrates an example of a scrambling mismatch within a Discovery Reference Signaling (DRS) Measurement Timing Configuration (DMTC) window.

An issue with CRS scrambling is that when "mf-MonitorTwoCRSScramblings" is FALSE, that is, the access terminal 120 does not have the capability to monitor both CRS scrambling possibilities (i.e., SF 0/5 scrambling and subframe-specific scrambling) and is only able to monitor one CRS scrambling possibility (typically SF 0/5 scrambling, as may be specified in a standard), the access terminal 120 may miss DRS subframes due to a scrambling mismatch within the DMTC window. This issue is illustrated in FIG. 3. In the example of FIG. 3, there are four DMTC windows 310 to 340. In DMTC window 310, DRS is transmitted on SF0, in DMTC window 320, DRS is transmitted on one of subframes SF1 to SF4, in DMTC window 330, DRS is transmitted on SF5, and in DMTC window 340, DRS is transmitted on one of subframes SF6 to SF9.

As illustrated in FIG. 3, if the "mf-MonitorTwoCRSScramblings" value is TRUE, the access terminal 120 will be able to detect all four DRS instances, whether or not occurring at SF0, SF5, or other subframes. However, if the "mf-MonitorTwoCRSScramblings" value is FALSE, the access terminal 120 may only be able to detect DRS on subframes SF0 and SF5 (because the access terminal 120 may not be able to determine whether DRS on remaining subframes SF 1-4 or SF 6-9 are associated with the standardized SF 0/5 scrambling or with subframe-specific scrambling), which is only half of the DRS opportunities in the example of FIG. 3. Thus, as can be seen, an issue with CRS scrambling is that when "mf-MonitorTwoCRSScramblings" is FALSE, the access terminal 120 may miss DRS subframes that do not occur at subframes SF0 and SF5.

If the access terminal 120 fails to detect DRS within the DMTC window (e.g., if the DMTC window ends without the access terminal 120 detecting DRS), the event is considered in RLF triggering. The event is captured as a lost subframe error (with some weight), which factors in the evaluation of the physical (PHY) layer being out of sync. More specifically, in LTE (either licensed or unlicensed), each CRS is used to compute a CRS Signal-to-Noise Ratio (SNR). The CRS SNR is mapped to an equivalent Physical Downlink Control Channel (PDCCH) Block Error Rate (BLER). There is some averaging of the BLER or SNR performed over multiple subframes. In LTE in unlicensed spectrum specifically, a missed DRS event is currently assigned an arbitrary BLER weight as a penalty. If, over some number of subframes, the aggregated BLER weights of missed DRS events are greater than a threshold, the result is "Qout," indicating poor reliability of the radio link (e.g., radio link 130). Alternatively, if the aggregated BLER weights of the missed DRS events are less than the threshold, the result is "Qin," indicating good reliability of the radio link.

As noted above, missed DRS events may be due to an LBT failure at the access point 110 (indicating poor reliability of the radio link) or a CRS scrambling mismatch at the access terminal 120 (which may not indicate poor reliability of the radio link). The assignment of a BLER weight, however, does not distinguish between whether a missed DRS event is due to an LBT failure at the access point 110 or a CRS scrambling mismatch at the access terminal 120. As a first solution, rather than merely assigning an arbitrary BLER weight as is conventionally done, the BLER weight assigned to missed DRS events may be adaptive based on the capability of the access terminal 120. For example, if the access terminal 120 is capable of monitoring both CRS possibilities (i.e., the "mf-MonitorTwoCRSScramblings" value is TRUE), it can assign a higher BLER weight to missed DRS events, whereas if the access terminal 120 is not capable of monitoring both CRS possibilities (i.e., the "mf-MonitorTwoCRSScramblings" value is FALSE), it can assign a lower BLER weight to missed DRS events. In some instances, a higher BLER weight leads to a more aggressive RLF declaration, insofar as the aggregated BLER weights will be higher. In this way, a lack of capability to monitor both CRS possibilities (also referred to as "opportunities") should not result in an overly aggressive RLF declaration.

As a second solution, the BLER weight may be adaptive based on the instantaneous searcher result (for PSS/SSS). In this solution, even though the access terminal 120 may not be capable of monitoring both CRS scrambling possibilities (i.e., the "mf-MonitorTwoCRSScramblings" value is FALSE), the BLER weight selection may be augmented by the PSS/SSS detection result since (a) PSS/SSS do not have a per-subframe scrambling and (b) PSS/SSS present an additional reliable way of monitoring link quality. More specifically, there may be an ambiguity with the CRS scrambling used. However, PSS/SSS signals do not have any subframe-specific scrambling issues. Therefore, a cell search (i.e., searcher) process based on PSS/SSS should resolve this ambiguity. Thus, if, for example, CRS is not detected, but PSS/SSS is detected, then a lower BLER weight can be assigned to missed DRS events than would be assigned if both CRS and PSS/SSS were not detected. In some instances, the first and second solutions can be combined, such that the BLER weight may be selected based on whether the access terminal 120 is or is not capable of monitoring both CRS possibilities and whether or not PSS/SSS is detected.

As a third solution, the BLER weight may be adaptive based on searcher history. In this solution, similar to the second solution but instead of using the instantaneous searcher result, the access terminal 120 can use the history of the searcher output. For example, the BLER weight may be a function of the number of successful CRS searches (i.e., CRS was detected) in the last N searches. This solution has an advantage over the second solution insofar as the instantaneous cell searcher result may not be readily available to the RLM engine (e.g., RLM manager 122). In some instances, the first and third solutions may be combined, such that the BLER weight assigned to missed DRS events may be selected based on whether the access terminal 120 is or is not capable of monitoring both CRS possibilities and the function of the number of successful CRS searches in the last N searches.

As a fourth solution, the BLER weight may be adaptive based on the DRS SNR and interference measurements of the radio link (e.g., radio link 130). In this solution, if the long-term history of DRS SNR and interference measurements indicates a good quality radio link, but an instantaneous DRS is missed, a lower BLER weight may be assigned to the missed DRS event than if the long-term DRS SNR is on the margin of RLF. Again, the first and fourth solutions may be combined, such that the BLER weight may be selected based on whether the access terminal 120 is or is not capable of monitoring both CRS possibilities and the long-term history of DRS SNR and interference measurements of the radio link.

As a fifth solution, the BLER weight may be adaptive based on a history of the reported Channel Quality Indicator (CQI) value for the radio link (e.g., radio link 130). As an extension of the DRS SNR, the particular CQI value reported can also be used to adapt the BLER weight. For example, if CQI=0 is observed too often, the observation may be interpreted as an indication of degraded radio link reliability and can be used to increase the BLER weight assigned to missed DRS events. As with the other solutions, the first and fifth solutions may be combined, such that the BLER weight assigned to missed DRS events may be selected based on whether the access terminal 120 is or is not capable of monitoring both CRS possibilities and the history of the reported CQI value.

As a sixth solution, the BLER weight may be adaptive based on the CRS detection history for the radio link (e.g., radio link 130). In this solution, if fewer than a certain number of CRS signals are detected over a certain period of time, then a higher BLER weight can be assigned to missed DRS events. This solution includes two sub-solutions, (1) CRS detection on DRS subframes, i.e., DRS detection, and (2) CRS detection on non-DRS subframes. More specifically, subframes that are part of DRS are mandatory as part of RLM in MulteFire™. Subframes that are outside DRS are optional. They both will contain the CRS. Again, the first and sixth solutions may be combined, such that the BLER weight assigned to missed DRS events may be selected based on whether the access terminal 120 is or is not capable of monitoring both CRS possibilities and the CRS detection history.

In some instances, the above-described solutions may be applied to an implementation that does not use BLER weighting specifically, but instead, uses a similar criteria to declare RLF. For example, the proposed solutions may be used in a system where missing eight out of the last ten CRS search attempts triggers RLF (or) gates the transmission of CQI feedback to the access point 110 via periodic and pseudo-periodic Physical Uplink Control Channel (PUCCH) transmissions.

Additionally, although each of solutions two to six may be combined with the first solution, as described above, any combination of solutions can be used to trigger RLF. For example, the first, third, fifth, and sixth solutions can be combined, such that the BLER weight assigned to missed DRS events could be selected based on whether the access terminal 120 is or is not capable of monitoring both CRS possibilities, the function of the number of successful CRS searches in the last N searches, the history of the reported CQI value, and the CRS detection history.

In a further aspect of the disclosure, as noted above, sparse CRS density is an additional issue to be handled in LTE in unlicensed spectrum. A proposed solution is that the RLF triggering conditions may be adapted to account for the fact that fewer CRS samples may be available to compute the Qout/Qin indications that are used to trigger RLF. The RLF triggering conditions may include the mapping of CRS SNR to BLER, the SNR averaging/filtering coefficients and the window length, the BLER averaging/filtering coefficients and the window length, and the BLER weight for missing DRS events.

For example, if fewer valid CRS instances are available, the more recent measurements may be given a higher weight in averaging. As another example, the PDCCH SNR to BLER mapping may include an additional margin to account for reduced CRS SNR/BLER averaging.

Figure 4:
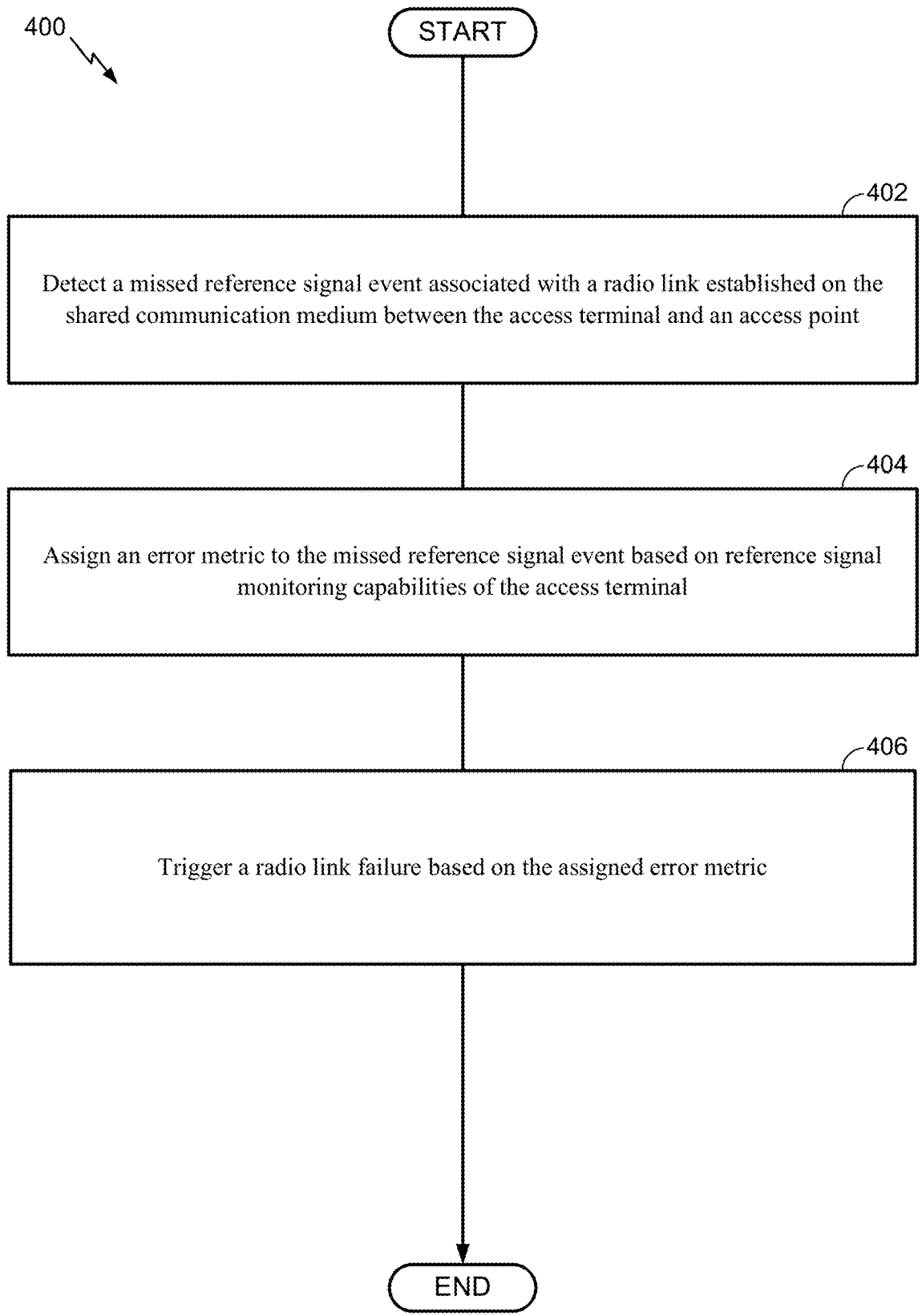
FIG. 4 is a flow diagram illustrating an example method of communication in accordance with the techniques described herein.

FIG. 4 is a flow diagram illustrating an example method 400 of communication in accordance with the techniques described above. The method 400 may be performed, for example, by an access terminal (e.g., the access terminal 120 illustrated in FIG. 1) operating on a shared communication medium (e.g., shared communication medium 140). As an example, the shared communication medium may include one or more time, frequency, or space resources on an unlicensed radio frequency band shared between LTE technology and Wi-Fi technology devices.

As shown, at block 402, the access terminal may detect a missed reference signal event (e.g., a missed DRS event) associated with a radio link (e.g., radio link 130) established over the shared communication medium. In an aspect, detecting the missed reference signal event may include determining that the access terminal did not detect a reference signal for measuring a quality of the radio link (e.g., a CRS signal) transmitted during the reference signal configuration window (e.g., the DMTC window). At block 404, the access terminal may assign an error metric (e.g., the BLER weight) to the missed reference signal event based on reference signal monitoring capabilities of the access terminal (e.g., the capability of the access terminal 120 to monitor both CRS possibilities). At block 406, the access terminal may trigger a radio link failure based on the assigned error metric.

For generality, the access terminal 120 is shown in FIG. 1 only in relevant part as including the RLM manager 122. It will be appreciated, however, that the access terminal 120 may be configured in various ways to provide or otherwise support the radio link monitoring techniques discussed herein.

Figure 5:
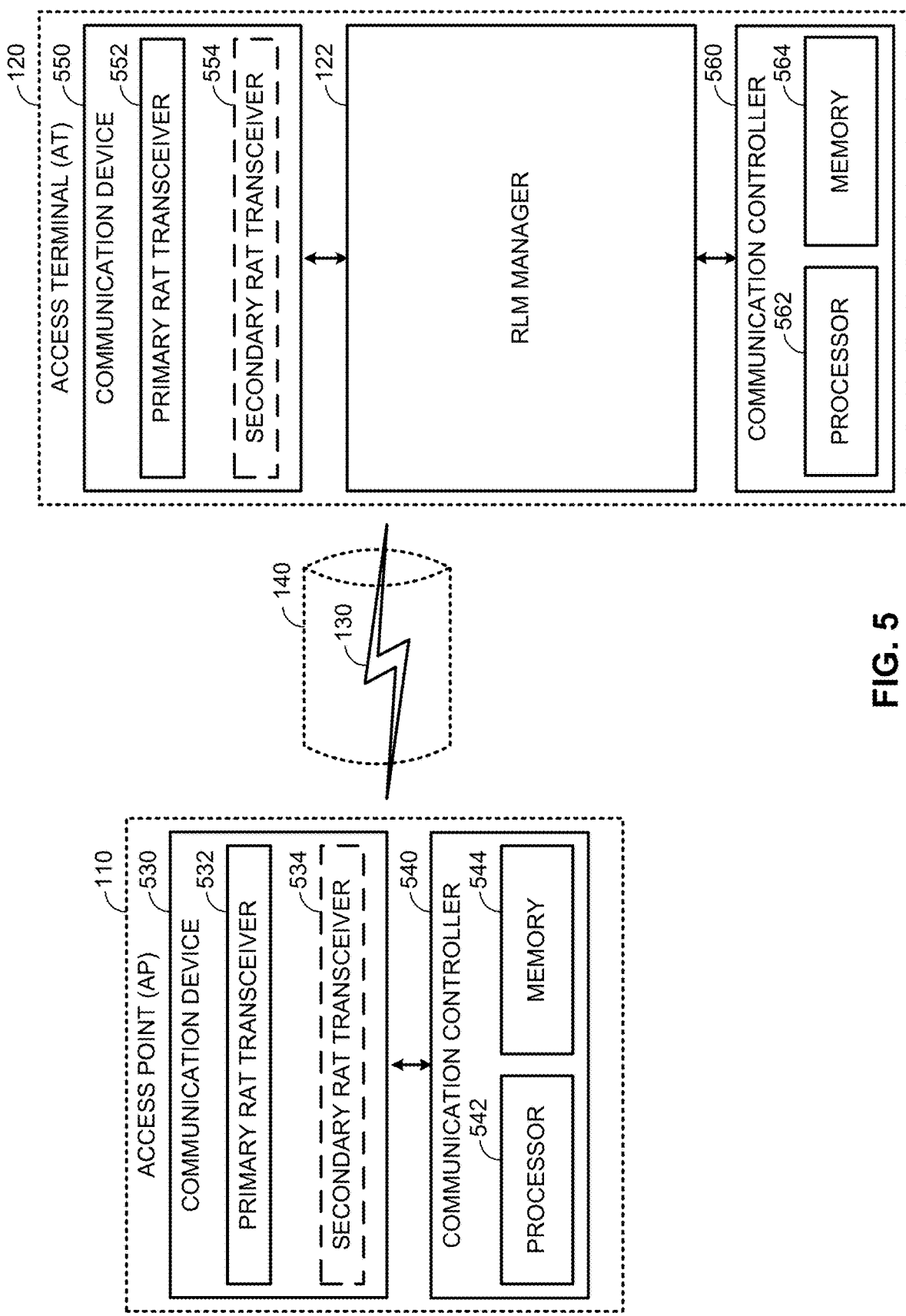
FIG. 5 is a device-level diagram illustrating example components of an access point and an access terminal in more detail.

FIG. 5 is a device-level diagram illustrating example components of the access point 110 and the access terminal 120 of the primary RAT system 100 in more detail. As shown, the access point 110 and the access terminal 120 may each generally include a wireless communication device (represented by the communication devices 530 and 550) for communicating with other wireless nodes via at least one designated RAT. The communication devices 530 and 550 may be variously configured for transmitting and encoding signals, and, conversely, for receiving and decoding signals in accordance with the designated RAT (e.g., messages, indications, information, pilots, and so on).

The communication devices 530 and 550 may include, for example, one or more transceivers, such as respective primary RAT transceivers 532 and 552, and, in some designs, (optional) co-located secondary RAT transceivers 534 and 554, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 540 and 560) for controlling operation of their respective communication devices 530 and 550 (e.g., directing, modifying, enabling, disabling, etc.). The communication controllers 540 and 560 may include one or more processors 542 and 562, and one or more memories 544 and 564 coupled to the processors 542 and 562, respectively. The memories 544 and 564 may be configured to store data, instructions, or a combination thereof, either as on-board cache memory, as separate components, a combination, etc. The processors 542 and 562 and the memories 544 and 564 may be standalone communication components or may be part of the respective host system functionality of the access point 110 and the access terminal 120.

The RLM manager 122 may be a hardware, software, or firmware (hardware and software) component of the access terminal 120 that may perform, or cause the performance of, the operations described herein. For example, the RLM manager 122 may be a separate circuit coupled to the communication device 550 and optionally the processor 562, or may be part of the circuitry of the processor 562, and may thereby perform the operations described herein. As another example, the RLM manager 122 may be a software module stored in the memory 564 that, when executed, causes the processor 562 and/or the communication device 550 to perform the operations described herein. It will be appreciated that the RLM manager 122 may also be implemented in different ways. In some designs, some or all of the functionality associated therewith may be implemented by or otherwise at the direction of at least one processor (e.g., one or more of the processors 562), at least one memory (e.g., one or more of the memories 564), at least one transceiver (e.g., one or more of the transceivers 552 and 554), or a combination thereof. In other designs, some or all of the functionality associated therewith may be implemented as a series of interrelated functional modules.

Accordingly, it will be appreciated that the components in FIG. 5 may be used to perform operations described above with respect to FIGS. 1-4. For example, the access terminal 120 may monitor, via the primary RAT transceiver 552, radio link conditions of a radio link established over a shared communication medium. The access terminal may adjust, via the processor 562 and the memory 564, an error metric (e.g., BLER weight) associated with the monitored radio link conditions. The access terminal may trigger, via the processor 562 and the memory 564, a radio link failure based on the adjusted error metric.

Figure 6:
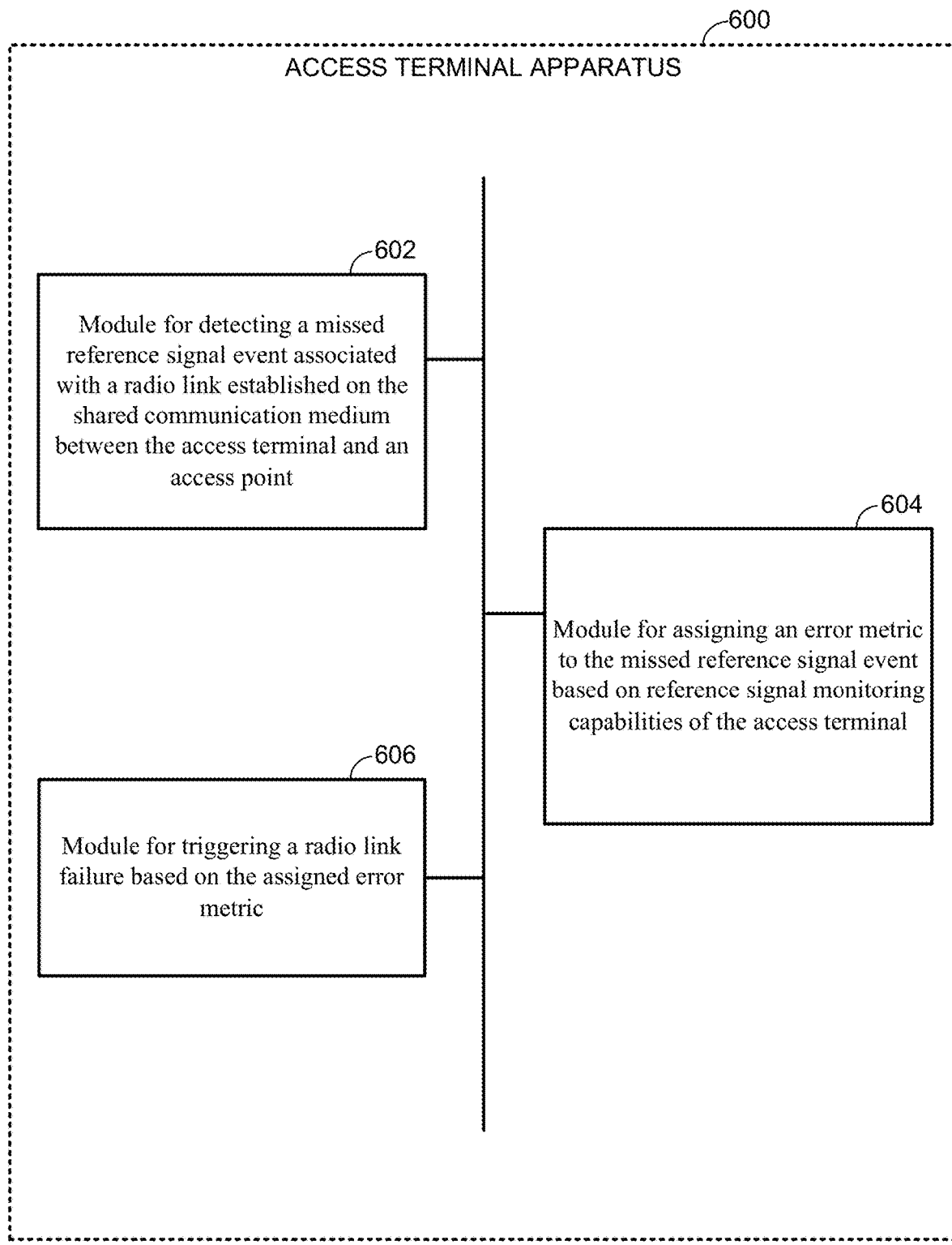
FIG. 6 illustrates an example apparatus represented as a series of interrelated functional modules.

FIG. 6 illustrates an example access terminal apparatus for implementing the RLM manager 122 represented as a series of interrelated functional modules. In the illustrated example, the apparatus 600 includes a module for detecting 602, a module for assigning 604, and a module for triggering 606.

The module for detecting 602 may be configured to detect a missed reference signal event associated with a radio link established over a shared communication medium. The module for assigning 604 may be configured to assign an error metric (e.g., BLER weight) to the missed reference signal event based on radio link monitoring capabilities of the access terminal apparatus. The module for triggering 606 may be configured to trigger a radio link failure based on the assigned error metric.

The functionality of the modules of FIG. 6 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 6 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for radio link monitoring on a shared communication medium, comprising:
    detecting, by an access terminal, a missed reference signal event associated with a radio link established on the shared communication medium between the access terminal and an access point, wherein detecting the missed reference signal event comprises determining that the access terminal did not detect a reference signal for measuring a quality of the radio link transmitted during a reference signal configuration window;
    assigning, by the access terminal, an error metric to the missed reference signal event based on reference signal monitoring capabilities of the access terminal, wherein assigning the error metric comprises:
        assigning a first value to the error metric based on the missed reference signal event and previous measurements of the radio link indicating that the radio link is a poor quality radio link; or
        assigning a second value to the error metric based on the missed reference signal event and the previous measurements of the radio link indicating that the radio link is a good quality radio link, wherein the first value is greater than the second value; and
    triggering, by the access terminal, a radio link failure based on the assigned error metric.

2. The method of claim 1, wherein the missed reference signal event comprises a missed Discovery Reference Signaling (DRS) event.

3. The method of claim 2, wherein the reference signal configuration window comprises a DRS Measurement Timing Configuration (DMTC) window.

4. The method of claim 1, wherein the reference signal for measuring the quality of the radio link comprises a Cell-specific Reference Signal (CRS).

5. The method of claim 1, wherein the reference signal monitoring capabilities of the access terminal comprise a capability of the access terminal to monitor multiple Cell-specific Reference Signal (CRS) opportunities.

6. The method of claim 5, wherein the capability of the access terminal to monitor multiple CRS opportunities is indicated by a mf-MonitorTwoCRSScramblings parameter.

7. The method of claim 1, wherein the radio link comprises a Long-Term Evolution (LTE) in unlicensed spectrum radio link.

8. The method of claim 1, wherein assigning the error metric is further based on whether the access terminal is capable of monitoring multiple reference signal opportunities in multiple subframes of the radio link reserved for reference signal transmission.

9. The method of claim 1, wherein assigning the error metric is further based on whether cell searching reference signals are detected.

10. The method of claim 9, wherein the cell searching reference signals comprise a Primary Synchronization Signal (PSS) and a Secondary Synchronization Signal (SSS).

11. The method of claim 1, wherein assigning the error metric is further based on a number of detected reference signal events over a threshold number of reference signal configuration windows, wherein the number of detected reference signal events comprises a number of times the access terminal detected the reference signal for measuring the quality of the radio link transmitted during the threshold number of reference signal configuration windows.

12. The method of claim 1, wherein the previous measurements of the radio link comprise a CRS Signal-to-Noise Ratio (SNR) and interference measurements.

13. The method of claim 1, wherein assigning the error metric is further based on a Channel Quality Indicator (CQI) value for the radio link.

14. The method of claim 13, wherein a higher value of the error metric is assigned based on the access terminal observing a CQI value of 0 greater than a threshold number of times than if the access terminal observes the CQI value of 0 less than the threshold number of times.

15. The method of claim 1, wherein a higher value of the error metric is assigned based on a number of missed reference signal events over a threshold period of time being greater than a threshold than if the number of missed reference signal events is less than the threshold period of time.

16. The method of claim 1, wherein determining that the access terminal did not detect the reference signal for measuring the quality of the radio link comprises determining that the access terminal did not detect the reference signal before an end of the reference signal configuration window.

17. An apparatus for radio link monitoring on a shared communication medium, comprising:
a processor;
memory coupled to the processor; and
instructions stored in the memory and operable, when executed by the processor, to cause the apparatus to:
  detect a missed reference signal event associated with a radio link established on the shared communication medium between the access terminal and an access point, wherein detection of the missed reference signal event comprises a determination that the access terminal did not detect a reference signal for measuring a quality of the radio link transmitted during a reference signal configuration window;
  assign an error metric to the missed reference signal event based on reference signal monitoring capabilities of the access terminal, wherein assigning the error metric comprises:
    assigning a first value to the error metric based on the missed reference signal event and previous measurements of the radio link indicating that the radio link is a poor quality radio link; or
    assigning a second value to the error metric based on the missed reference signal event and the previous measurements of the radio link indicating that the radio link is a good quality radio link, wherein the first value is greater than the second value; and
  trigger a radio link failure based on the assigned error metric.

18. The apparatus of claim 17, wherein the missed reference signal event comprises a missed Discovery Reference Signaling (DRS) event.

19. The apparatus of claim 17, wherein the reference signal for measuring the quality of the radio link comprises a Cell-specific Reference Signal (CRS).

20. The apparatus of claim 17, wherein the radio link monitoring capabilities of the access terminal comprise a capability of the access terminal to monitor multiple Cell-specific Reference Signal (CRS) opportunities.

21. The apparatus of claim 17, wherein assigning the error metric is further based on whether the access terminal is capable of monitoring multiple reference signal opportunities in multiple subframes of the radio link reserved for reference signal transmission.

22. The apparatus of claim 17, wherein assigning the error metric is further based on whether cell searching reference signals are detected.

23. The apparatus of claim 17, wherein assignment of the error metric is further based on a number of detected reference signal events over a threshold number of reference signal configuration windows, wherein the number of detected reference signal events comprises a number of times the access terminal detected the reference signal for measuring the quality of the radio link transmitted during the threshold number of reference signal configuration windows.

24. The apparatus of claim 17, wherein a higher value of the error metric is assigned based on a number of missed reference signal events over a threshold period of time being greater than a threshold than if the number of missed reference signal events is less than the threshold period of time.

25. An apparatus for radio link monitoring on a shared communication medium, comprising:
  means for detecting a missed reference signal event associated with a radio link established on the shared communication medium between the access terminal and an access point, wherein detection of the missed reference signal event comprises a determination that the access terminal did not detect a reference signal for measuring a quality of the radio link transmitted during a reference signal configuration window;
  means for assigning an error metric to the missed reference signal event based on reference signal monitoring capabilities of the access terminal, wherein the means for assigning the error metric comprises:
    means for assigning a first value to the error metric based on the missed reference signal event and previous measurements of the radio link indicating that the radio link is a poor quality radio link; and
    means for assigning a second value to the error metric based on the missed reference signal event and the previous measurements of the radio link indicating that the radio link is a good quality radio link, wherein the first value is greater than the second value; and
  means for triggering a radio link failure based on the assigned error metric.

26. A non-transitory computer-readable medium storing computer-executable instructions for radio link monitoring on a shared communication medium, the computer-executable instructions executable to:
  detect a missed reference signal event associated with a radio link established on the shared communication medium between the access terminal and an access point, wherein detecting the missed reference signal event comprises determining that the access terminal did not detect a reference signal for measuring a quality of the radio link transmitted during a reference signal configuration window;
  assign an error metric to the missed reference signal event based on reference signal monitoring capabilities of the access terminal, wherein assigning the error metric comprises:
    assigning a first value to the error metric based on the missed reference signal event and previous measurements of the radio link indicating that the radio link is a poor quality radio link; or
    assigning a second value to the error metric based on the missed reference signal event and the previous measurements of the radio link indicating that the radio link is a good quality radio link, wherein the first value is greater than the second value; and
  trigger a radio link failure based on the assigned error metric.

27. The method of claim 1, wherein the error metric comprises a Block Error Rate (BLER) weight.

28. The apparatus of claim 17, wherein the error metric comprises a Block Error Rate (BLER) weight.

* * * * *